US005619567A

United States Patent [19]
Apfel

[11] Patent Number: 5,619,567
[45] Date of Patent: Apr. 8, 1997

[54] VARIABLE DC FEED CHARACTERISTIC IN A SUBSCRIBER LINE INTERFACE CIRCUIT

[75] Inventor: Russell J. Apfel, Austin, Tex.

[73] Assignee: Advanced Micro Devices, Sunnyvale, Calif.

[21] Appl. No.: 332,512

[22] Filed: Oct. 31, 1994

[51] Int. Cl.⁶ ............................ H04M 1/00; H04M 19/00
[52] U.S. Cl. ................... 379/413; 379/377; 379/399
[58] Field of Search .......................... 379/377, 381, 379/399, 413, 424, 382, 322, 324

[56] References Cited

U.S. PATENT DOCUMENTS

| | | | |
|---|---|---|---|
| 4,406,929 | 9/1983 | Pace et al. | 379/402 |
| 4,473,719 | 9/1984 | Embree et al. | 379/382 |
| 4,563,547 | 1/1986 | Booth | 379/342 |
| 4,636,587 | 1/1987 | Zoerner | 379/377 |
| 4,827,503 | 5/1989 | Takato et al. | 379/373 |
| 4,908,856 | 3/1990 | Poletto | 379/413 |
| 4,975,949 | 12/1990 | Wimsalt et al. | 379/387 |
| 5,113,434 | 5/1992 | Fox | 379/413 |
| 5,148,475 | 9/1992 | Warwick et al. | 379/399 |
| 5,323,461 | 6/1994 | Rosenbaum et al. | 379/399 |
| 5,347,577 | 9/1994 | Takato et al. | 379/413 |
| 5,511,118 | 4/1996 | Gores et al. | 379/399 |

Primary Examiner—Krista M. Zele
Assistant Examiner—Devendra T. Kumar
Attorney, Agent, or Firm—Foley & Lardner

[57] ABSTRACT

A telephone subscriber line interface circuit includes off-hook detection circuitry, a plurality of current or voltage sources, and a switch responsive to the off-hook detection circuitry to add and subtract currents or voltages. The interface circuit thereby tailors a feed characteristic in an on-hook and an off-hook condition of the telephone.

19 Claims, 4 Drawing Sheets

VARIABLE DC FEED CHARACTERISTIC IN A SUBSCRIBER LINE INTERFACE CIRCUIT

BACKGROUND OF THE INVENTION

1. Field of the Invention

The invention relates to subscriber interfaces to telephone lines, in general, and in particular to a subscriber line interface circuit (SLIC). The invention provides a method and apparatus for varying the DC feed characteristics in a SLIC coupled to a telephone subscriber line. More particularly, the invention relates to a method and apparatus for actively varying the DC feed characteristic of the SLIC in response to telephone operating conditions.

2. Related Art

Subscriber line interface circuits (SLICs) were developed to provide an interface between a telephone subscriber and a telephone central office. One such SLIC is the Am7953, manufactured by Advanced Micro Devices, Inc. of Sunnyvale, Calif. When used with other devices, such as a CODEC/filter or a subscriber line audio processing circuit (SLAC), the SLIC can be programmed to realize desired telephone service characteristics. Together, the SLIC and the other circuitry, such as the SLAC, can be implemented as part of a line card to achieve battery feed, overload protection, ringing, line supervision, 2-wire to 4-wire analog hybrid conversion, and test features necessary for basic telephone service. A telephone line consists of two conductors labelled tip or A and ring or B, respectively. Accordingly, the SLIC has tip and ring terminals for connection to the telephone line.

In a telephone system, power is fed from a central office to its various subscribers by subscriber loops. The subscriber equipment, such as a telephone, must receive sufficient electric current to properly function. The electric circuit in the central office supplying the current of the load formed by the transmission line and the subscriber equipment is known as a battery feed circuit.

The battery feed circuit supplies a DC current to the subscriber. Upon the DC current are superimposed AC signals, typically of audio frequency, by which information is conveyed to the subscriber from the central office and from the subscriber to the central office and onward.

The typical battery voltage in the United States is −48 volts. One conventional battery feed circuit such as that shown in FIG. 1a has a battery feed characteristic such as that shown in FIG. 1b. As shown in FIG. 1b, as the load current increases from 0 to 120 milliamps, the battery feed voltage decreases from 48 volts to 0 volts. The battery feed characteristic of a conventional battery feed circuit is illustrated in FIG. 1b by line 1 in which $V_{TR}=48\ V-(I_L \times 400\ \Omega)$.

More contemporary systems using subscriber line interface circuits rarely require more than 40 to 60 milliamps and therefore implement current limiting, for example, at 60 milliamps, as shown in FIG. 1b. Current limiting reduces the overall power dissipation of the SLIC and of the subscriber loop. Electronic SLICs use a portion of the battery voltage to drive amplifiers within the SLICs, thereby resulting in an overhead voltage loss. As a result of this overhead voltage loss, without additional circuitry, an electronic SLIC would be unable to supply adequate current to telephone lines having long loops.

An electronic SLIC can emulate the feed resistance without using a physical resistor, thereby avoiding the power dissipation and voltage drops in a physical resistor. However, a low value sense resistor is usually required as a means for monitoring telephone line current. When the telephone line voltage approaches the battery voltage, the electronic circuit can reduce the emulated feed resistance, thus reducing the effective voltage drop required to support the feed characteristic. However, it is impractical to reduce the emulated feed resistance to a value as low as the sense resistors. Therefore, there still remains overhead voltage lost to the emulated impedance. One purpose of the invention described herein is to recover most of this overhead voltage lost to the emulated impedance.

FIG. 2 shows a battery feed characteristic for an electronic constant current SLIC. The output amplifiers of the SLIC introduce an offset voltage, for example, five volts of overhead voltage. Thus, in the on-hook condition (zero load current), the voltage across the tip and ring terminals is approximately the battery voltage reduced by five volts. In the load condition, after the telephone is off hook, the battery feed voltage is reduced by another 4 volts to the battery voltage minus 9 volts. The additional 4 volt reduction is a result of the emulated resistance in this region and is much greater than necessary for proper device operation. Therefore, it is desirable to reduce this additional voltage and to provide higher voltage in the off hook condition.

SUMMARY AND OBJECTS OF THE INVENTION

In view of the voltage reductions and other effects in conventional systems using electronic SLICs, it is an object of the invention to provide a SLIC which reduces the overhead voltage loss in the on-hook condition.

It is another object of the invention to provide a battery feed characteristic which is independently tailored for the on-hook and off-hook conditions.

It is still another object of the invention to provide a battery feed characteristic which, in the off-hook case, provides the minimum current specified in applicable standards into standard loads from standard battery voltages. By way of example, and not limitation, in the United States this is typically 20 milliamps into a 1930 ohm load in normal operation. In addition to the telephone line load, electronic SLICs usually require a protection resistor for fault conditions such as lightning and power cross. This is typically a 50 ohm resistor per lead. This raises total load impedance to 2030 ohms. Under a low battery condition of 42.5 V the requirement drops down to 18 mA.

It is a still further object of the invention to provide an on-hook characteristic which is compatible with other equipment connected to a telephone line which operates responsive to the line voltage. By way of example and not limitation, this includes maintenance test units that independently test telephone equipment, or a telefax machine which can seize a telephone line when it detects a line voltage greater than 40 volts and otherwise assumes that the line is in use.

It is a still further object of the invention to provide a SLIC with such a multi-component battery feed characteristic.

These and other objects of the invention are provided by a telephone interface circuit which includes off-hook detection circuitry and a battery feed emulation circuit which is responsive to the state of the off hook detection circuit. The telephone interface circuit also includes a switch responsive to the off-hook detection circuit to add and subtract currents or voltages and thereby tailor a feed characteristic in an on-hook and an off-hook condition of the telephone. The feed characteristic has an on-hook component and an off-hook component which are independent. The on-hook component represents a first voltage overhead and the off-hook component represents a second voltage overhead. The invention is accomplished in an integrated circuit as disclosed in detail further herein. Although disclosed in detail in a constant current context, the invention is equally applicable to a resistive feed circuit emulating a constant resistance from a voltage source.

BRIEF DESCRIPTION OF THE DRAWINGS

The invention will be described in particularity with reference to the drawings, in which.

For purposes of clarity and ease in understanding the invention, like elements will be identified by like reference numerals in the various drawings.

DETAILED DESCRIPTION OF THE PREFERRED EMBODIMENTS

Figure 1A:
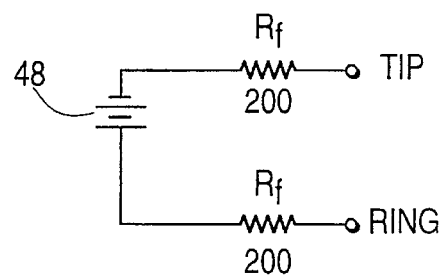
FIG. 1a illustrates a conventional battery feed circuit.
Figure 1B:
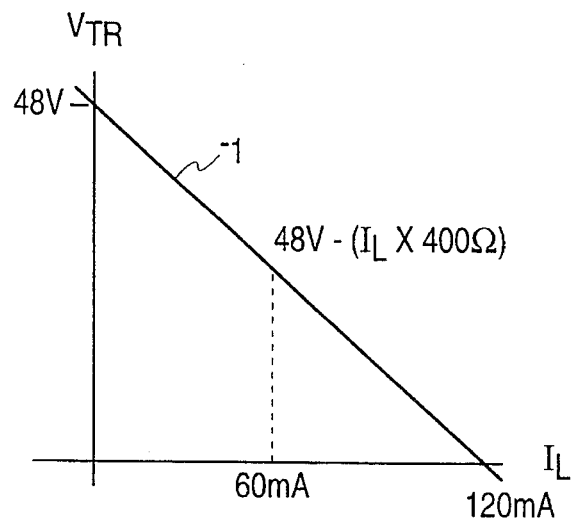
FIG. 1b illustrates a conventional battery feed characteristic.
Figure 2:
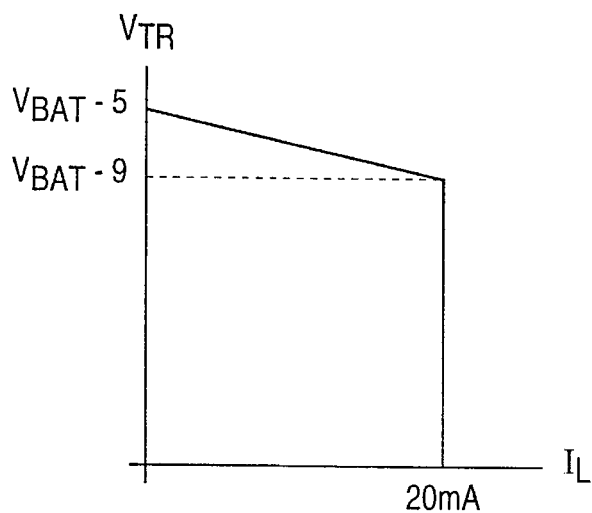
FIG. 2 illustrates an electronic SLIC battery feed characteristic.
Figure 3:
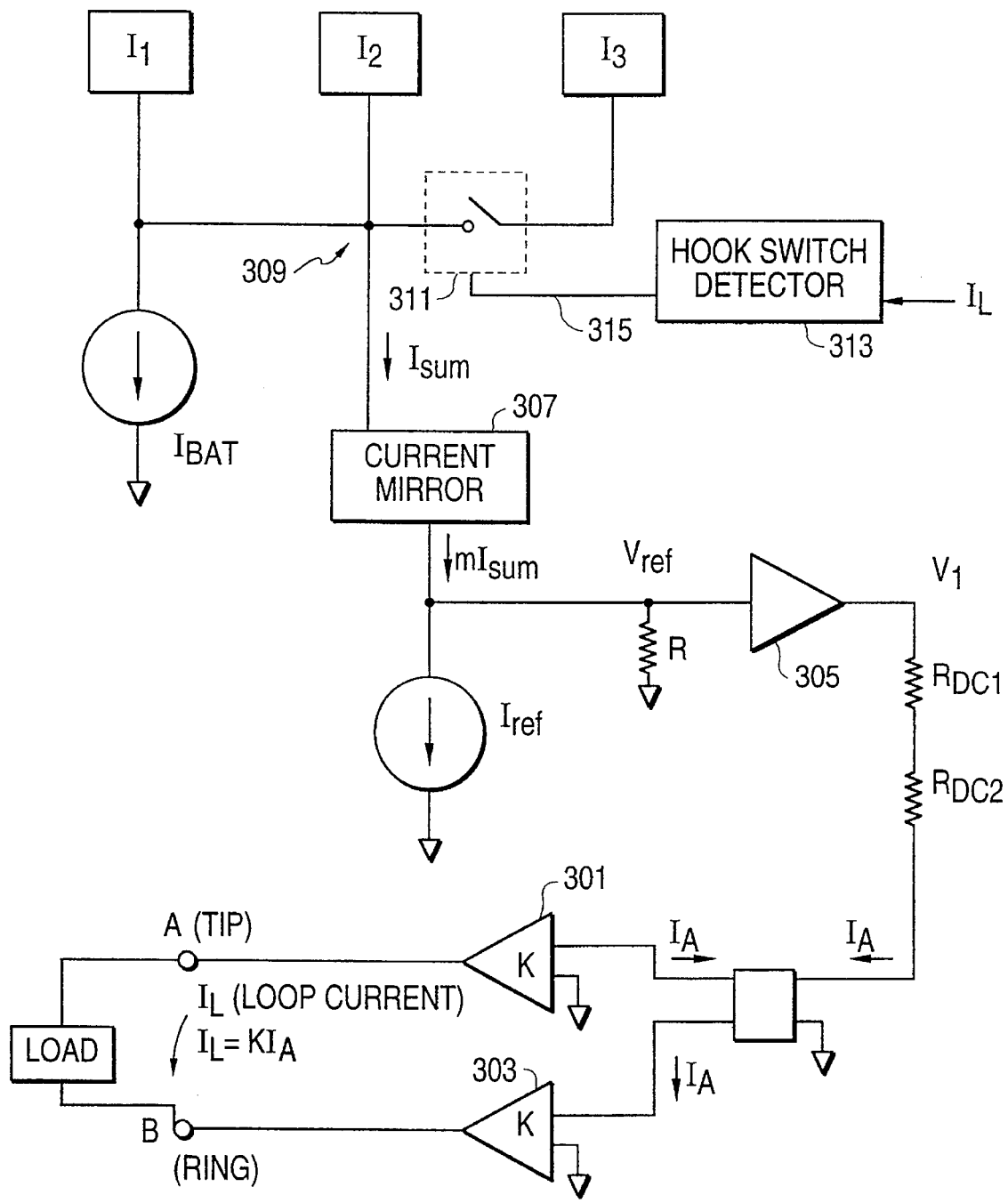
FIG. 3 illustrates a block diagram of an electronic SLIC battery feed circuit according to the invention.

FIG. 3 is a block diagram of a telephone interface circuit according to the invention. The tip and ring conductors of the telephone line interface are connected to terminals A and B, respectively. Each of these terminals is an output from a current amplifier 301 and 303, respectively. The current amplifiers receive a current $I_A$, which is defined by a voltage $V_1$ provided by amplifier 305, as follows:

$$I_A = V_1/(R_{DC1} + R_{DC2})$$

It will be clear to those of ordinary skill that the load current $I_L$ provided to the loop is defined by the product of the gain K of current amplifier 301 and current $I_A$. Thus, the load current $I_L$ is a function of the voltage $V_1$ and the resistors $R_{DC1}$ and $R_{DC2}$. Variations provided to the loop. As the voltage $V_1$ increases, the loop current $I_L$ also increases.

Amplifier 305 produces voltage $V_1$ in response to reference voltage $V_{ref}$. Reference voltage $V_{ref}$ is defined by the current through resistor R. This current is a function of reference current $I_{ref}$ and $mI_{sum}$ which is the output of current mirror 307. As current is drawn through resistor R, reference voltage $V_{ref}$ achieves a higher absolute value and the absolute value of the voltage $V_1$ at the output of amplifier 305 follows along. Thus, $V_1$, which ultimately determines the load current as previously discussed, is a function of current in the resistor R.

The current in resistor R is determined by the operation of the various current sources in the circuit of FIG. 3. The sum of the currents into junction 309 must equal the sum of the currents out of the same junction. The current in the battery current source, $I_{bat}$, is proportional to the battery voltage. The current in the offset current source, $I_2$, is constant. Current $I_1$ is proportional to the voltage across terminals A and B. When switch 311 is open, current $I_{sum}$ equal the sum of $I_1$ and $I_2$ minus $I_{BAT}$. When the switch is closed, $I_{sum}$ equals the sum of $I_1$, $I_2$ and $I_3$ minus $I_{BAT}$. Current mirror 307 provides an output with the following characteristics: if $I_{sum} < 0$, $mI_{sum} = 0$; if $I_{sum} > 0$, $mI_{sum} =$ the product of m and $I_{sum}$, where m is a scale factor. Current $I_3$ is also a constant current and is applied to junction 309 in response to a control signal to switch 311 from hook switch detector 313. Hook switch detector 313 monitors the load current $I_L$ and provides a hook switch detection whose threshold is lower than the programmed constant current.

When the voltage between A and B is small, as in a normal off-hook condition, $I_{sum}$ is less than 0. Therefore, $mI_{sum} = 0$ and $V_1$ will be a constant voltage=$I_{ref}$ R. Therefore, $I_A$ is constant and $I_L$ is constant. This establishes the constant current region of the feed characteristic. In this region, the hook switch detector 313 indicates the off-hook condition and switch 311 will be open. As the load resistance increases, $V_{AB}$ (the voltage across the line) increases to the point where $I_{sum}$ becomes>0 and $mI_{sum}$ becomes>0. $mI_{sum}$ will then cause $V_{ref}$ to be reduced, thereby reducing $V_1$ and $I_A$, and consequently reducing loop current $I_L$. As the load resistance increases further causing $V_{AB}$ to increase further, the loop current decreases until the hook switch detector 313 changes state. When this occurs, $I_3$ is switched in, increasing $I_{sum}$ and $mI_{sum}$, which further reduces $V_{ref}$, thereby further reducing loop current $I_L$. As load resistance increases further, $V_{AB}$ continues to increase until loop current $I_L$ goes to 0.

When starting in an on-hook condition, switch 311 is closed and $mI_{sum}$ approximates $I_{ref}$, making $V_{ref} = 0$, $V_1 = 0$ and $I_L$ approximately 0. As the load impedances decrease, load current begins to flow because $I_1$ begins to decrease, which decreases $I_{sum}$ and $mI_{sum}$. This allows $V_{ref}$ to move away from 0. The loop current will increase until it reaches a point where the hook switch detector 313 is tripped and switch 311 opens, eliminating current $I_3$. This further reduces $I_{sum}$ and $mI_{sum}$, which further increases $V_{ref}$, $I_1$ and $I_L$. $I_L$ will continue to increase until $I_{sum}$ goes to 0 and the device goes into the constant current region.

In this way, a two component battery feed characteristic is created, with one of the components being representative of the off-hook condition and another component of the battery feed characteristic being representative of the on-hook condition.

Figure 4:
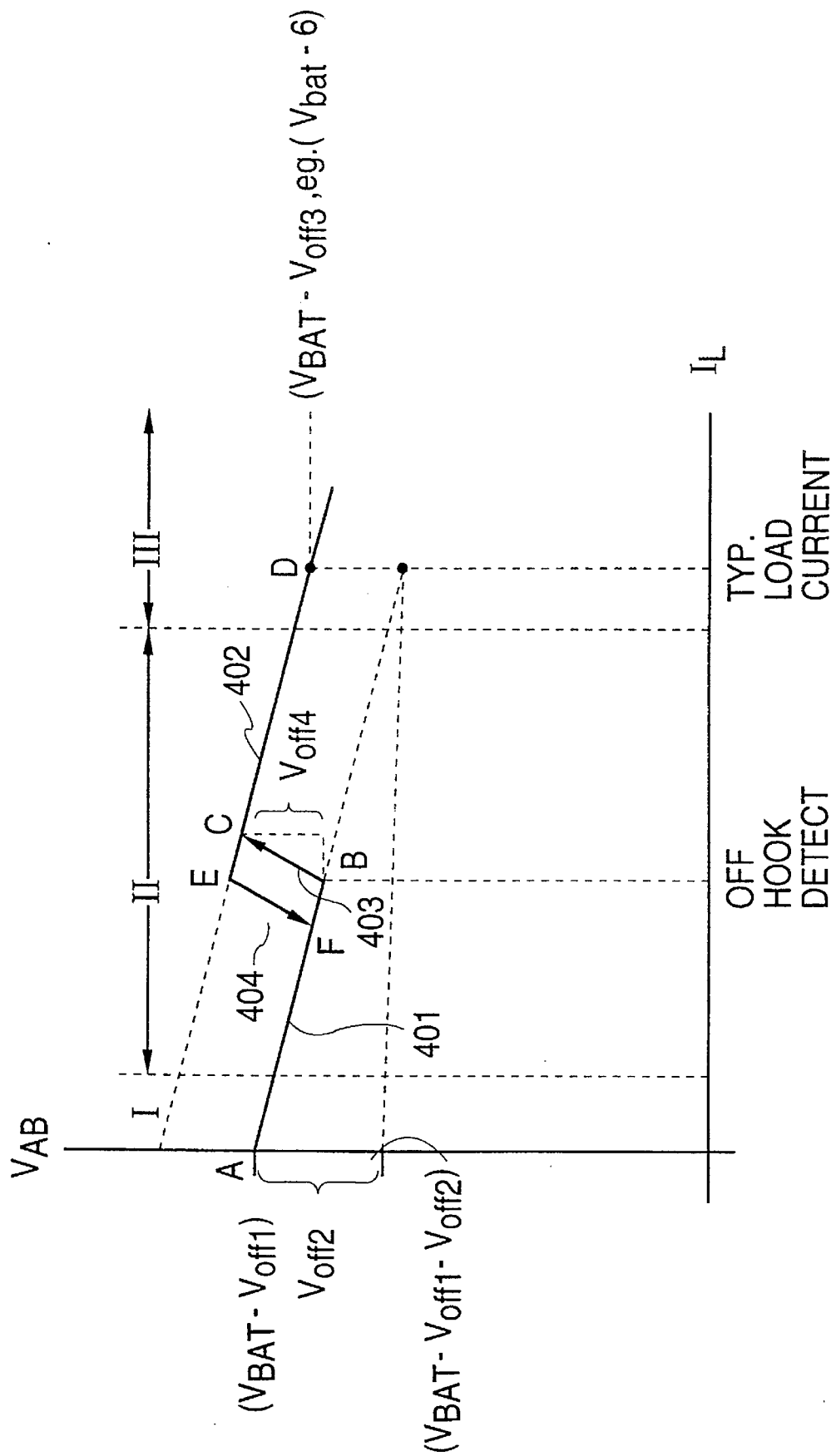
FIG. 4 illustrates an electronic SLIC battery feed characteristic provided by the battery feed circuit of FIG. 3.

FIG. 4 illustrates the DC feed characteristic for a SLIC according to the invention. FIG. 4 shows conditions affecting the SLIC in three regions. The first region designated by I is the on-hook region. Region II represents a generally invalid operating region. In most systems, an off-hook condition is defined by a load resistance of less than the resistance of the longest valid telephone line, which is typically less than 3000 ohms. An on-hook condition is defined as a load resistance greater than the worst case leakage resistance, which is typically about 10,000 ohms. The region between these limits is generally considered an invalid operating region. Within this region, the step change in current when a telephone line goes off-hook is detected by hook switch detector 313 (FIG. 3). Region III represents a typical off-hook operating region.

As illustrated in FIG. 4, the voltage across terminals A and B begins at the battery voltage minus an overhead used to drive amplifiers 301 and 303. One typical example is an overhead voltage of 5 volts, as shown in FIG. 4 at point A. This overhead voltage represents the point where $I_A$, $I_L$, and $V_{ref} = 0$ and $mI_{sum} = I_{ref}$. This is determined by the value of $I_{ref}$, $I_{bat}$, $I_1$, $I_2$ and $I_3$ and m. As the load current increases, the voltage across terminals A and B decreases along a first battery feed characteristic 401. Projected to its end at the right side of FIG. 4, at a typical load current, the voltage across terminals A and B would equal $V_{BAT}-V_{off1}-V_{off2}$. The additional loss of $V_{off2}$ is detrimental to circuit operations, as previously discussed.

These detrimental effects are avoided according to the invention by the off-hook detection which occurs in the invalid operating region II. Off-hook detection takes place at a load current level which is less than the typical load current for the loop but is sufficiently large to accurately indicate an off-hook condition exists. According to the invention, when the off-hook condition is detected, the switch 311 (FIG. 3) is opened, disconnecting the current source $I_3$ from the junction 309 and, thereby causing an increase in $V_{AB}$, as previously discussed. Thus, in the off-hook condition, the battery feed characteristic switches to the second characteristic, shown in FIG. 4 as characteristic 402. Battery feed characteristic 402 is chosen such that the operating point of the typical load current is at a battery voltage minus an offset voltage $V_{off3}$. The offset voltage $V_{off3}$ is selected such that the overhead DC voltage for operating the amplifiers and the SLIC and the anticipated range of AC voltage can be accommodated without clipping the AC signal. For example, if 5 volts DC overhead is required to operate the SLIC amplifiers and one volt peak amplitude of AC voltage is anticipated, the offset at the typical load current can be set to 6 volts. This case is shown in FIG. 4. Point D occurs where $I_{sum}=0$ and is going from the transition from a negative value to a positive value. This point is determined solely by $I_{bat}$, $I_1$ and $I_2$.

It should further be noted that the difference between the overhead voltage according to the first battery feed characteristic and the second battery feed characteristic at the typical load current is used to set current $I_3$ shown in FIG. 3.

It should further be noted that the transition between the first battery feed characteristic 401 and the second battery feed characteristic 402 is not entirely vertical with respect to voltage, as illustrated in FIG. 4. Line 403 indicates that the transition from the first battery feed characteristic 401 to the second battery feed characteristic 402 has a slope. The slope is a function of the resistance in the subscriber loop, which is assumed to be resistive. A similar effect occurs in the transition from the off-hook condition to the on-hook condition, thereby resulting in the transition line 404 between battery feed characteristic 402 and battery feed characteristic 401. This characteristic provides hysteresis and enhanced stability. This results from the fact that in either transition (off/on or on/off) the switch characteristic pushes the loop current $I_L$ further past the threshold, thus improving stability and providing noise margin.

Figure 5:
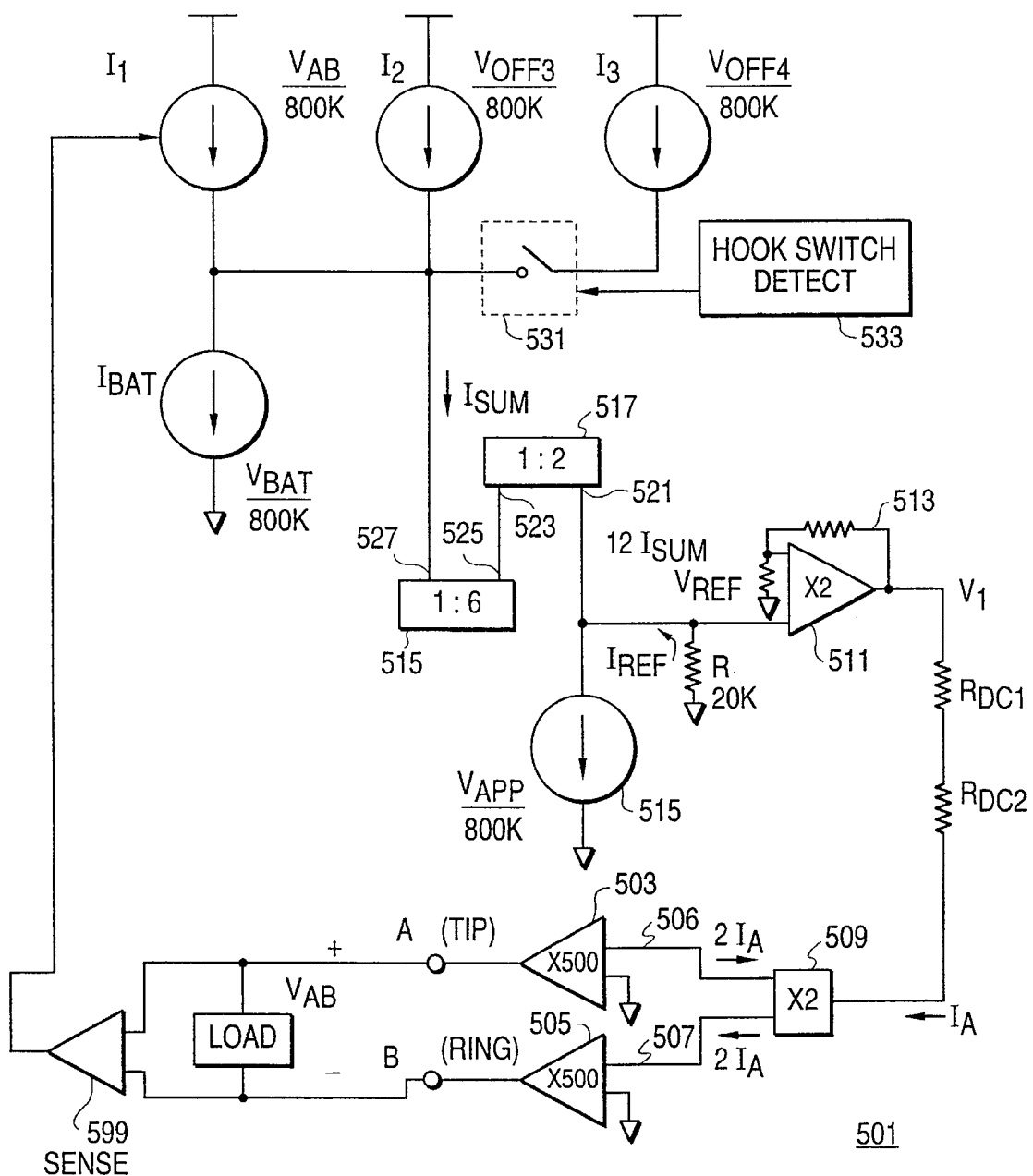
FIG. 5 illustrates a schematic diagram of an electronic SLIC battery feed circuit according to the invention.

FIG. 5 illustrates a schematic diagram of an electronic SLIC battery feed circuit 501 according to the invention. The circuit 501 includes a first current amplifier 503 coupled to terminal A and a second current amplifier 505 coupled to terminal B. The current amplifiers 503, 505 provide AC signals representative of audible sound and superimposed on a DC voltage to a telephone line which may be coupled to the terminals A, B. The amplifiers provide a load current $I_L$ to the telephone line.

The amplifiers 503, 505 amplify signals received at amplifier inputs 506, 507, respectively, by a factor of about, for example, 500. The signals received at the amplifier inputs 506, 507 are supplied by input circuit 509, which, for example, has a gain of about 2. Such high gain is used in order to minimize system power dissipation. Thus, the total current gain of the input circuit 509 and the output amplifiers 503, 505 is about 1000.

The input circuit 509 receives a current $I_A$ which is defined by a voltage $V_1$ provided by amplifier 511 as follows:

$$I_A = V_1/(R_{DC1}+R_{DC2})$$

Thus, the load current $I_L$ supplied to the telephone line is a function of the voltage $V_1$ and the resistors $R_{DC1}$ and $R_{DC2}$. As a result, variations in the voltage $V_1$ will result in changes in the load current $I_L$ provided to the telephone line. As the voltage $V_1$ increases, the loop current will also increase.

The amplifier 511 includes a feedback network 513 and provides a voltage gain, for example, substantially equal to 2. The amplifier 511 produces the voltage $V_1$ in response to the reference voltage $V_{ref}$. The reference voltage $V_{ref}$ is defined by the current $I_{ref}$ through the resistor R.

A constant current source 515 establishes the value of $V_1$ in the region. This is set to about 2.5 V, which allows amplifier 511 to run off a 5 V power supply in order to minimize power dissipation. In this case, the value of current source 515 would be set to $$\frac{1.25 \text{ V}}{R}$$

where, R=20 k. $I_{BAT}$ is proportional to $V_{BAT}$ and is usually generated across a large resistance to minimize power dissipation. In this case, an 800 k resistance is used. Current source $I_1$ is proportional to the voltage between A and B and is also generated by using a large R. An 800 k resistance is used in this case to provide good matching and tracking with current $I_{bat}$. $I_1$ can be generated from source amplifier 599. Current sources $I_2$ and $I_3$ are constant current sources generated from resistances and voltage refs $V_{off3}$ and $V_{off4}$ shown in FIG. 4.

Current source $I_3$ is disconnected from the junction 529 by switch 531. Switch 531 opens in response to a control signal from the hook switch detector 533. The hook switch detector 533 monitors the load current $I_L$ to determine when the telephone line is in an off-hook condition. Any of a variety of off-hook detector circuits known in the art can be used. When the hook switch detector 533 determines that the telephone line is off-hook, the hook switch detector 533 causes the switch 531 to be opened. Current $I_{sum}$ equals $I_1+I_2-I_{bat}$ when switch 531 is open and equals $I_1+I_2+I_{bat}$ when switch 531 is closed. Current mirror 515 is a unidirectional current mirror and only provides an output of $6I_{sum}$ when $I_{sum}>0$ and an output of 0 when $I_{sum}<0$. The output of current mirror 515 feeds current mirror 517 which provides an additional gain of 2 so that its output is $12I_{sum}$ when $I_{sum}>0$.

When a subscriber is on hook and there is no load current, the output of amplifier 511, $V_1$, should be 0. Therefore, $V_{ref}$ is 0, and $$12I_{sum} = \frac{1.25 \text{ V}}{20 \text{ k}} .$$

Under this condition, $I_{sum}$ equals $(V_{AB}+V_{off3}+V_{off4}-V_{bat})/800$ k. Solving this equation, $$V_{AB} = V_{BAT} + \left(\frac{1.25 \text{ V}}{20 \text{ k}}\right)\left(\frac{800 \text{ k}}{12}\right) - V_{off3} - V_{off4}.$$

$V_{off1}$ in FIG. 4 equals $$V_{off3} + V_{off4} - \left(\frac{1.25\ V}{20\ k}\right)\left(\frac{800\ k}{12}\right).$$

$V_{off2}$ is equal to $$\left(\frac{1.25\ V}{20\ k}\right)\left(\frac{800\ k}{12}\right).$$

As the loop resistance decreases, $V_{AB}$ decreases, thereby reducing $12I_{sum}$, and increasing loop current $I_L$ from 0 to the constant current value. When the loop resistance reaches a value when the loop current equals the hook switch threshold, switch 531, opens disconnecting $I_3$. $I_{sum}$ is reduced by this and $12I_{sum}$ is reduced by $12I_3$. This causes $V_{ref}$ and $V_1$ to increase, thereby increasing the loop current and pushing the loop current away from the hook switch detector threshold. When $I_1+I_2=I_{bat}$, $I_{sum}$ becomes 0 and the device enters the constant current region. This is set by the value of $V_{off3}$, and the voltage at point D in FIG. 4, indicated as $V_{BAT}-V_{off3}$.

Operation in the reverse direction is the same as previously described with respect to FIG. 3. This way, a two component battery feed component is created with the off hook characteristic set by $I_1$, $I_2$, $I_{bat}$, the value of current source 515 and the gains of the various circuit components. The on-hook characteristic is set by the same components plus the value of current source $I_3$.

While the embodiments disclosed herein are discussed as current sources which are proportional to voltages, other embodiments using voltage summing and differences will be apparent to those of ordinary skill as being within the scope of the invention.

While the invention has been described with respect to the preferred physical embodiment constructed in accordance therewith, it will apparent to those skilled in the art that various modifications and improvements may be made without departing from the scope and spirit of the invention. Accordingly, it is to be understood that the invention is not to be limited by its specific illustrative embodiment, but only by the scope of the appended claims.

What is claimed is:

1. A telephone interface circuit for coupling to a subscriber line including a telephone, the telephone interface circuit comprising:

off-hook detection circuitry; and a switch responsive to said off-hook detection circuitry to tailor a feed characteristic in an on-hook and an off-hook state of said telephone, wherein said feed characteristic includes a first region indicative of said on-hook state of said telephone, a second region indicative of said off-hook state of said telephone, and a third region between said first and second regions, said third region being indicative of a state of transition of said telephone between said on-hook state and said off-hook state, wherein said off-hook detection circuitry detects said off-hook condition in said third region, and wherein said feed characteristic has a first component representative of a first voltage overhead and a second component representative of a second voltage overhead.

2. The apparatus recited in claim 1 wherein said feed characteristic has an on-hook component and an off-hook component.

3. The apparatus recited in claim 2 wherein said on-hook component and said off-hook component are independent.

4. The apparatus recited in claim 1 wherein said first component is an on-hook component and said second component is an off-hook component.

5. A telephone interface circuit for coupling to a subscriber line including a telephone, said subscriber line including a ring line and a tip line, the telephone interface circuit comprising:

off-hook detection circuitry for outputting an off-hook detection signal based on an amount of load current flowing through the ring and tip lines;

a plurality of current sources, said plurality of current sources including a first constant current source, a second constant current source, a third constant current source, and a fourth current source which is dependent on a voltage difference between the ring and tip lines; and a switch responsive to said off-hook detection signal from said off-hook detection circuitry to add and subtract certain ones of said plurality of current sources to tailor a feed characteristic in an on-hook and an off-hook condition of said telephone, wherein said feed characteristic has a first component representative of a first voltage overhead and a second component representative of a second voltage overhead.

6. The apparatus recited in claim 5 wherein said feed characteristic has an on-hook component and an off-hook component.

7. The apparatus recited in claim 6 wherein said on-hook component and said off-hook component are independent.

8. The apparatus recited in claim 5 wherein said first component is an on-hook component and said second component is an off-hook component.

9. The apparatus recited in claim 5, wherein said load current is a function of said first constant current source, said second constant current source, said third constant current source, and said fourth current source in a first mode, wherein said load current is a function of said first constant current source, said second constant current source, and said fourth current source in a second mode, wherein said switch is operable to switch said third constant current source to be combined with said first constant current source, said second constant current source and said fourth current source in said first mode, and wherein said switch is operable to switch said third constant current source away from said first constant current source, said second constant current source, and said fourth current source in said second mode.

10. The apparatus recited in claim 5, wherein, when said telephone is currently in the off-hook condition and said load current is above a predetermined current value, said third constant current source is switched away from said first constant current source, said second constant current source, and said fourth current source, and wherein, when said telephone is currently in the off-hook condition and said load current is below said predetermined current value, said third constant current source is switched to be combined with said first constant current source, said second constant current source, and said fourth current source, such that said telephone is placed into the on-hook condition.

11. The apparatus recited in claim 5, wherein, when said telephone is currently in the on-hook condition and said load current is below a predetermined current value, said third constant current source is switched to be combined with said first constant current source, said second constant current source, and said fourth current source, and wherein, when said telephone is currently in the on-hook condition and said load current is above said predetermined value, said third constant current source is switched away from said first constant current source, said second constant current source, and said fourth current source, such that said telephone is placed into the off-hook condition.

12. A telephone interface circuit for coupling to a subscriber line including a telephone, said subscriber line including a ring line and a tip line, the telephone interface circuit comprising:

off-hook detection circuitry for outputting an off-hook detection signal based on an amount of load current flowing through the ring and tip lines;

a plurality of voltage sources, said plurality of voltage sources including a first constant voltage source, a second constant voltage source, a third constant voltage source, and a fourth voltage source which is dependent on a voltage difference between the ring and tip lines; and a switch responsive to said off-hook detection signal from said off-hook detection circuitry to add and subtract certain ones of said plurality of voltage sources to tailor a feed characteristic in an on-hook and an off-hook condition of said telephone, wherein said feed characteristic has a first component representative of a first voltage overhead and a second component representative of a second voltage overhead.

13. The apparatus recited in claim 12 wherein said feed characteristic has an on-hook component and an off-hook component.

14. The apparatus recited in claim 13 wherein said on-hook component and said off-hook component are independent.

15. The apparatus recited in claim 12 wherein said first component is an on-hook component and said second component is an off-hook component.

16. The apparatus recited in claim 12, wherein said load current is a function of said first constant voltage source, said second constant voltage source, said third constant voltage source, and said fourth voltage source in a first mode, wherein said load current is a function of said first constant voltage source, said second constant voltage source, and said fourth voltage source in a second mode, wherein said switch is operable to switch said third constant voltage source to be combined with said first constant voltage source, said second constant voltage source and said fourth voltage source in said first mode, and wherein said switch is operable to switch said third constant voltage source away from said first constant voltage source, said second constant voltage source, and said fourth voltage source in said second mode.

17. The apparatus recited in claim 12, wherein, when said telephone is currently in the off-hook condition and said load current is above a predetermined current value, said third constant voltage source is switched away from said first constant voltage source, said second constant voltage source, and said fourth voltage source, and wherein, when said telephone is currently in the off-hook condition and said load current is below said predetermined current value, said third constant voltage source is switched to be combined with said first constant voltage source, said second constant voltage source, and said fourth voltage source, such that said telephone is placed into the on-hook condition.

18. The apparatus recited in claim 12, wherein, when said telephone is currently in the on-hook condition and said load current is below a predetermined current value, said third constant voltage source is switched to be combined with said first constant voltage source, said second constant voltage source, and said fourth voltage source, and wherein, when said telephone is currently in the on-hook condition and said load current is above said predetermined value, said third constant voltage source is switched away from said first constant voltage source, said second constant voltage source, and said fourth voltage source, such that said telephone is placed into the off-hook condition.

19. A telephone interface circuit for coupling to a subscriber line including a telephone, said subscriber line including a ring line and a tip line, the telephone interface circuit comprising:

detection circuitry for outputting an off-hook detection signal upon detection of an off-hook condition of said telephone that previously was in an on-hook state, and for outputting an on-hook detection signal upon detection of an on-hook condition of said telephone that previously was in an off-hook state; and a switch responsive to said detection circuitry to tailor a feed characteristic for said on-hook and said off-hook condition of said telephone, wherein said feed characteristic includes a first feed characteristic when said telephone is converted from said on-hook state to said off-hook state, and a second feed characteristic when said telephone is converted from said off-hook state to said on-hook state, wherein said first feed characteristic is different from said second feed characteristic, wherein a load current flows across said ring and tip lines, and a voltage difference Vab exists between said ring and tip lines, wherein, when said load current rises above a first predetermined value when said telephone is determined as being in said on-hook state by said detection circuitry, said detection circuitry outputs said off-hook detection signal to convert said telephone to said off-hook state, wherein when said load current falls below a second predetermined value when said telephone is determined as being in said off-hook state by said detection circuitry, said detection circuitry outputs said on-hook detection signal to convert said telephone to said on-hook state, and wherein said voltage difference Vab is at a higher voltage upon conversion of said telephone from said off-hook state to said on-hook state than upon conversion of said telephone from said on-hook state to said off-hook state.

* * * * *